(12) United States Patent
Lee

(10) Patent No.: US 8,988,618 B2
(45) Date of Patent: Mar. 24, 2015

(54) STEREOSCOPIC DISPLAY COMPRISING A PHASE RETARDER HAVING A PLURALITY OF FIRST AND SECOND STRIP SHAPES AND A PLURALITY OF BOARD-LIKE STRUCTURES DISPOSED IN A LIQUID-CRYSTAL LAYER

(75) Inventor: Chia-Yu Lee, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 414 days.

(21) Appl. No.: 13/639,467

(22) PCT Filed: Jun. 8, 2012

(86) PCT No.: PCT/CN2012/076638
§ 371 (c)(1),
(2), (4) Date: Oct. 4, 2012

(87) PCT Pub. No.: WO2013/181839
PCT Pub. Date: Dec. 12, 2013

(65) Prior Publication Data
US 2013/0329142 A1    Dec. 12, 2013

(51) Int. Cl.
G02F 1/1335  (2006.01)
G02F 1/1339  (2006.01)
G02B 27/22   (2006.01)
G02B 5/30    (2006.01)
G02B 27/26   (2006.01)

(52) U.S. Cl.
CPC .............. *G02B 27/22* (2013.01); *G02B 5/3083* (2013.01); *G02B 27/26* (2013.01); *H04N 2213/001* (2013.01)
USPC .............................. 349/15; 349/156; 359/462

(58) Field of Classification Search
USPC ...................................... 349/15; 359/462–473
See application file for complete search history.

(56) References Cited

U.S. PATENT DOCUMENTS

| | | | | |
|---|---|---|---|---|
| 5,956,001 A * | 9/1999 | Sumida et al. | .................. | 345/55 |
| 2009/0040401 A1* | 2/2009 | Tamura et al. | .................. | 349/15 |
| 2009/0141201 A1* | 6/2009 | Yeh et al. | ......................... | 349/15 |
| 2011/0157698 A1* | 6/2011 | Yoshimi | ........................ | 359/462 |
| 2011/0216277 A1* | 9/2011 | Chen et al. | ..................... | 349/117 |

* cited by examiner

*Primary Examiner* — Paul Lee
(74) *Attorney, Agent, or Firm* — Mark M. Friedman

(57) ABSTRACT

The present invention discloses a stereoscopic display, which includes a phase retarder a display panel, and board-like structures. The phase retarder has a plurality of first strip shapes and a plurality of second strip shapes. The first strip shapes and the second strip shapes are alternately arranged. The display panel has a plurality of pixels. The pixels are arranged into a plurality of pixel rows corresponding to the first strip shapes and the second strip shapes. The board-like structures are disposed in the liquid-crystal layer of the display panel. The pixel rows are respectively separated from each other by the board-like structures, thereby reducing a crosstalk phenomenon.

15 Claims, 4 Drawing Sheets

STEREOSCOPIC DISPLAY COMPRISING A PHASE RETARDER HAVING A PLURALITY OF FIRST AND SECOND STRIP SHAPES AND A PLURALITY OF BOARD-LIKE STRUCTURES DISPOSED IN A LIQUID-CRYSTAL LAYER

FIELD OF THE INVENTION

The present invention relates to a display, and especially to a stereoscopic display (three-dimensional display).

BACKGROUND OF THE INVENTION

With the rapid development of display technology in recent years, stereoscopy is an important developing trend. A stereoscopic display typically consists of a liquid crystal display (LCD) panel and micro-optical components (e.g. parallax barriers or a patterned phrase retarder). The LCD panel displays a left eye image and a right eye image on corresponding pixels. The role of the micro-optical components is to control the left eye image only being seen by a left eye of a viewer and the right eye image only being seen by a right eye of the viewer. When the left and right eyes of the viewer respectively receive the suitable left eye image and the suitable right eye image, the images fuse in the brain of the viewer and the viewer senses stereoscopic vision.

Referring to FIG. 1, FIG. 1 is a schematic drawing illustrating a conventional stereoscopic display that adopts a patterned phrase retarder. The conventional stereoscopic display 100 includes a patterned phrase retarder 110 and an LCD panel 120. The patterned phrase retarder 110 has a plurality of first strip shapes 112 and a plurality of second strip shapes 114. The first strip shapes 112 and the second strip shapes 114 are alternately arranged. Phase retardation of the first strip shape 112 is different from that of the second strip shape 114, so that light passing through the first strip shape 112 and the second strip shape 114 has different polarization states. Corresponding glasses 140 having specific polarization directions are utilized to respectively receive the left and right eye images L and R, thereby achieving an effect of displaying stereoscopic images.

However, as shown in FIG. 1, a small proportion of the right eye image R may enter a left eye lens 142 when in actual use. Similarly, a small proportion of the left eye image L may enter a right eye lens 144, too. Accordingly, this causes a crosstalk phenomenon in the images, then influencing a 3D viewing effect of the viewer.

SUMMARY OF THE INVENTION

An objective of the present invention is to provide a stereoscopic display which can decrease the crosstalk phenomenon occurring in the conventional stereoscopic display to further raise the 3D viewing effect.

To achieve the foregoing objective, a stereoscopic display provided by the present invention includes a phase retarder, a display panel, and board-like structures. The phase retarder has a plurality of first strip shapes and a plurality of second strip shapes. The first strip shapes and the second strip shapes are alternately arranged. The display panel has a first substrate, a second substrate, and a liquid-crystal layer disposed between the first substrate and the second substrate. The display panel further has a plurality of pixels. The pixels are arranged into a plurality of pixel rows corresponding to the first strip shapes and the second strip shapes. The board-like structures are disposed in the liquid-crystal layer of the display panel. The pixel rows are respectively separated from each other by the board-like structures.

In the stereoscopic display of the present invention, a length of the board-like structures is equal to a length of the pixel rows, and a height of the board-like structures is less than or equal to a thickness of the liquid-crystal layer.

In the stereoscopic display of the present invention, the board-like structures are disposed on the first substrate. Specifically, the first substrate is a color filter on array (COA) substrate. In another embodiment, the first substrate is a TFT array substrate, and the second substrate is a color filter substrate.

In other embodiments, the first substrate is a color filter substrate, and the second substrate is a TFT array substrate. Moreover, the board-like structures are disposed on black matrices of the color filter substrate.

In the stereoscopic display of the present invention, the board-like structures are made of high molecular polymers.

In the stereoscopic display of the present invention, the first strip shapes and the second strip shapes are parallel to a horizontal direction. In another embodiment, the first strip shapes and the second strip shapes are parallel to a vertical direction.

In comparison with the prior art, one of the board-like structures is disposed between two adjacent pixel rows for obstructing therebetween, so an image of the pixel rows corresponding to the first strip shapes is not easy to be transmitted to the second strip shapes of the phase retarder. Similarly, an image of the pixel rows corresponding to the second strip shapes is not easy to be transmitted to the first strip shapes of the phase retarder. Therefore, the crosstalk phenomenon is decreased, and the 3D viewing effect of the stereoscopic display is raised. Moreover, as to a display panel fabricated by color filter on array (COA) processes, because a color filter structure is positioned on the array substrate, the color filter is located far from the phase retarder. Thus, the crosstalk phenomenon is more serious. However, the images of the pixel rows can be controlled to propagate in suitable directions, so that the crosstalk phenomenon is decreased.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Descriptions of the following embodiments refer to attached drawings which are utilized to exemplify specific embodiments.

Figure 1:
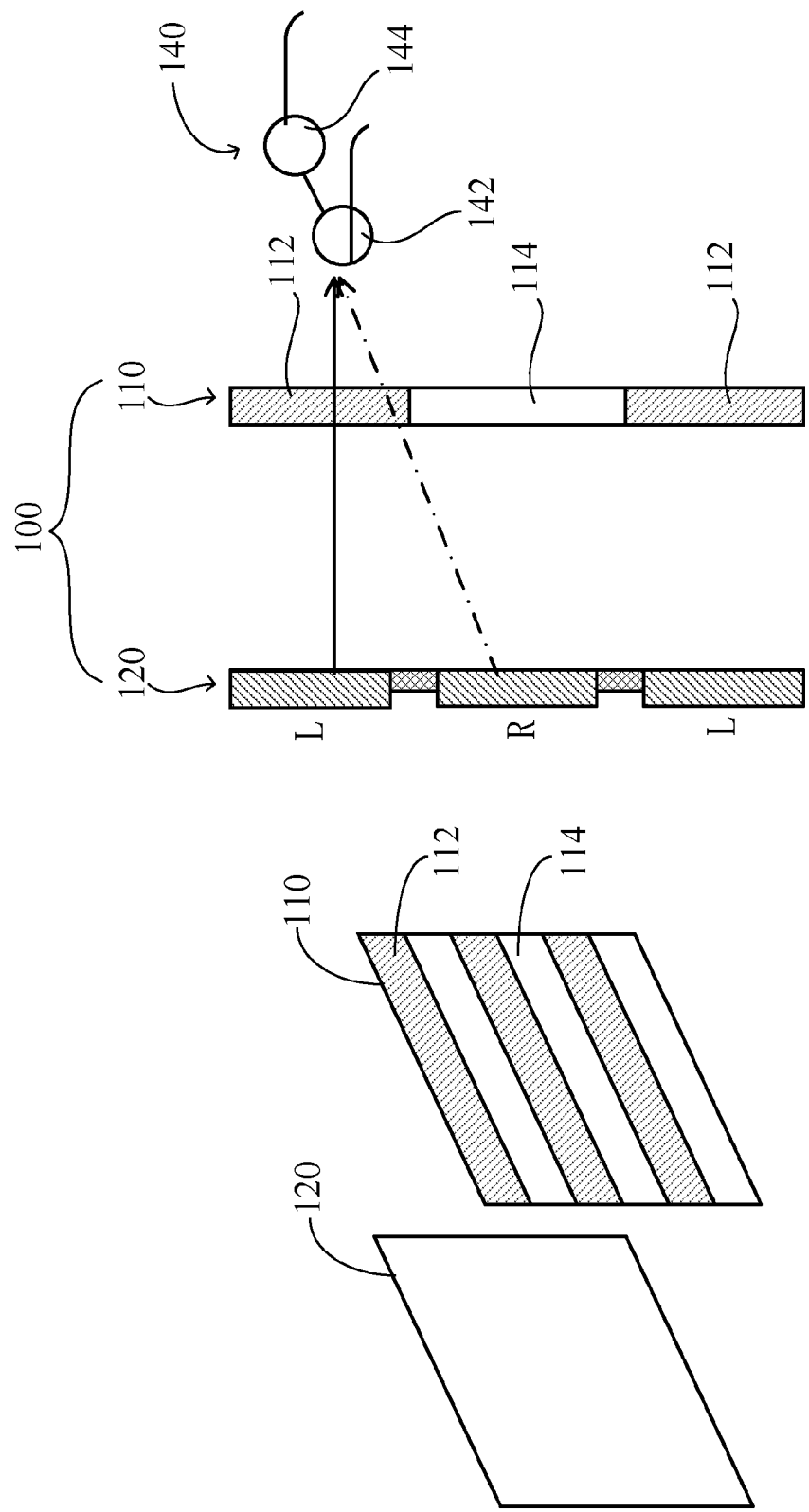
FIG. 1 is a schematic drawing illustrating a conventional stereoscopic display that adopts a patterned phrase retarder.
Figure 2:
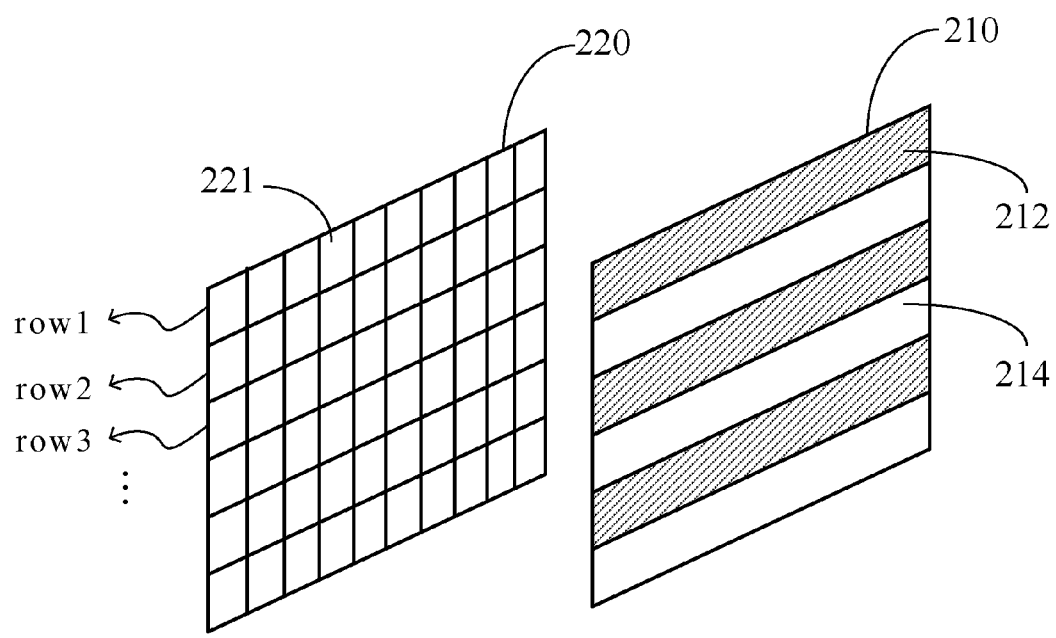
FIG. 2 is a explode view schematically illustrating a stereoscopic panel of the present invention.
Figure 3:
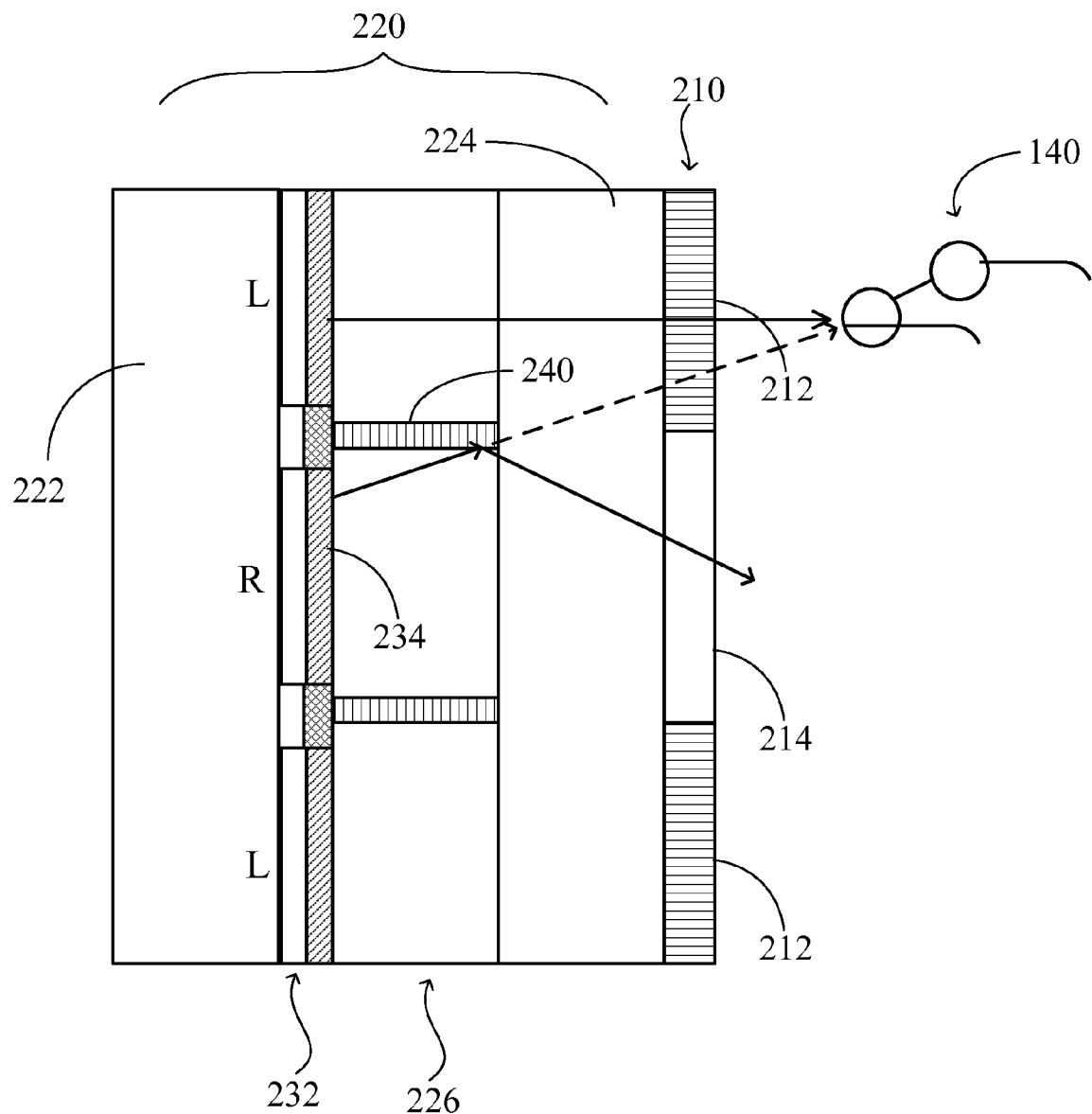
FIG. 3 is a partial sectional view illustrating a stereoscopic panel according to a first preferred embodiment of the present invention.

Referring to FIG. 2 and FIG. 3, FIG. 2 is a explode view schematically illustrating a stereoscopic panel of the present invention, and FIG. 3 is a partial sectional view illustrating a stereoscopic panel according to a first preferred embodiment of the present invention. The stereoscopic display 200 of the first preferred embodiment of the present invention includes a phase retarder 210, a display panel 220, and board-like structures 240 (as shown in FIG. 2). The phase retarder 210 has a plurality of first strip shapes 212 and a plurality of second strip shapes 214. The first strip shapes 212 and the second strip shapes 214 are alternately arranged along a vertical direction. In the embodiment, the first strip shapes 212 and the second strip shapes 214 are parallel to a horizontal direction. However, in other embodiments, the first strip shapes and the second strip shapes can be parallel to the vertical direction. That is, the first strip shapes 212 and the second strip shapes 214 are alternately arranged along the horizontal direction. Specifically, the phase retarder 210 is a quarter-wave array plate. Furthermore, there is a 45-degree angle between a direction of an optical axis in the first strip shapes 212 of the quarter-wave array plate and the horizontal direction, also there is a 135-degree angle between a direction of an optical axis in the second strip shapes 214 of the quarter-wave array plate and the horizontal direction.

Referring to FIG. 3, in the first preferred embodiment, the display panel 220 is a display panel fabricated by color filter on array (COA) processes. The display panel 220 has a first substrate 222, a second substrate 224, and a liquid-crystal layer 226 disposed between the first substrate 222 and the second substrate 224. Specifically, a thin-film transistor array 232 is disposed on the first substrate 222, and a plurality of color resists 234 are disposed on the thin-film transistor array 232. In short, the first substrate 222 is a COA substrate.

Referring to FIG. 2 again, the display panel 220 further has a plurality of pixels 221. The pixels 221 are arranged into a plurality of pixel rows, row 1 to row N, corresponding to the first strip shapes 212 and the second strip shapes 214. In the embodiment, odd number rows (row 1, row 3, . . . ) of the pixel rows correspond to the plurality of first strip shapes 212, and even number rows (row 2, row 4, . . . ) of the pixel rows correspond to the plurality of second strip shapes 214. In addition, the image given by the odd number rows of the pixel rows is defined as a left eye image L, and the image given by the even number rows of the pixel rows is defined as a right eye image R.

Referring to FIG. 3 again, the board-like structures 240 is disposed in the liquid-crystal layer 226 of the display panel 220. The plurality of pixel rows (row 1 to row N) are respectively separated from each other by the board-like structures 240. In the embodiment, a length of the board-like structures 240 is equal to a length of the pixel rows (i.e. the length of one side of the display panel 220), and a height of the board-like structures 240 is less than or equal to a thickness of the liquid-crystal layer 226.

In the embodiment, the board-like structures are 240 disposed on the first substrate 222 (i.e. the COA substrate). Specifically, the board-like structures 240 can be formed in the manufacture processes of the COA substrate. Preferably, the board-like structures 240 are made of high molecular polymers. However, in other embodiments, the board-like structures 240 also can be formed on the second substrate 224.

As shown in FIG. 3, one of the board-like structures 240 is disposed between the two adjacent pixel rows for obstructing therebetween. Therefore, the right eye image R of the pixel rows corresponding to the second strip shapes 214 is reflected by the board-like structure 240, so it is not easy to be transmitted to the first strip shapes 212 of the phase retarder 210 for entering the left lens of the glasses 140. Similarly, the left eye image L of the pixel rows corresponding to the first strip shapes 212 is reflected by the board-like structure 240, so it is not easy to be transmitted to the second strip shapes 214 of the phase retarder 210 for entering the right lens of the glasses 140. As a result the crosstalk phenomenon is decreased, and the 3D viewing effect of the stereoscopic display is raised.

Figure 4:
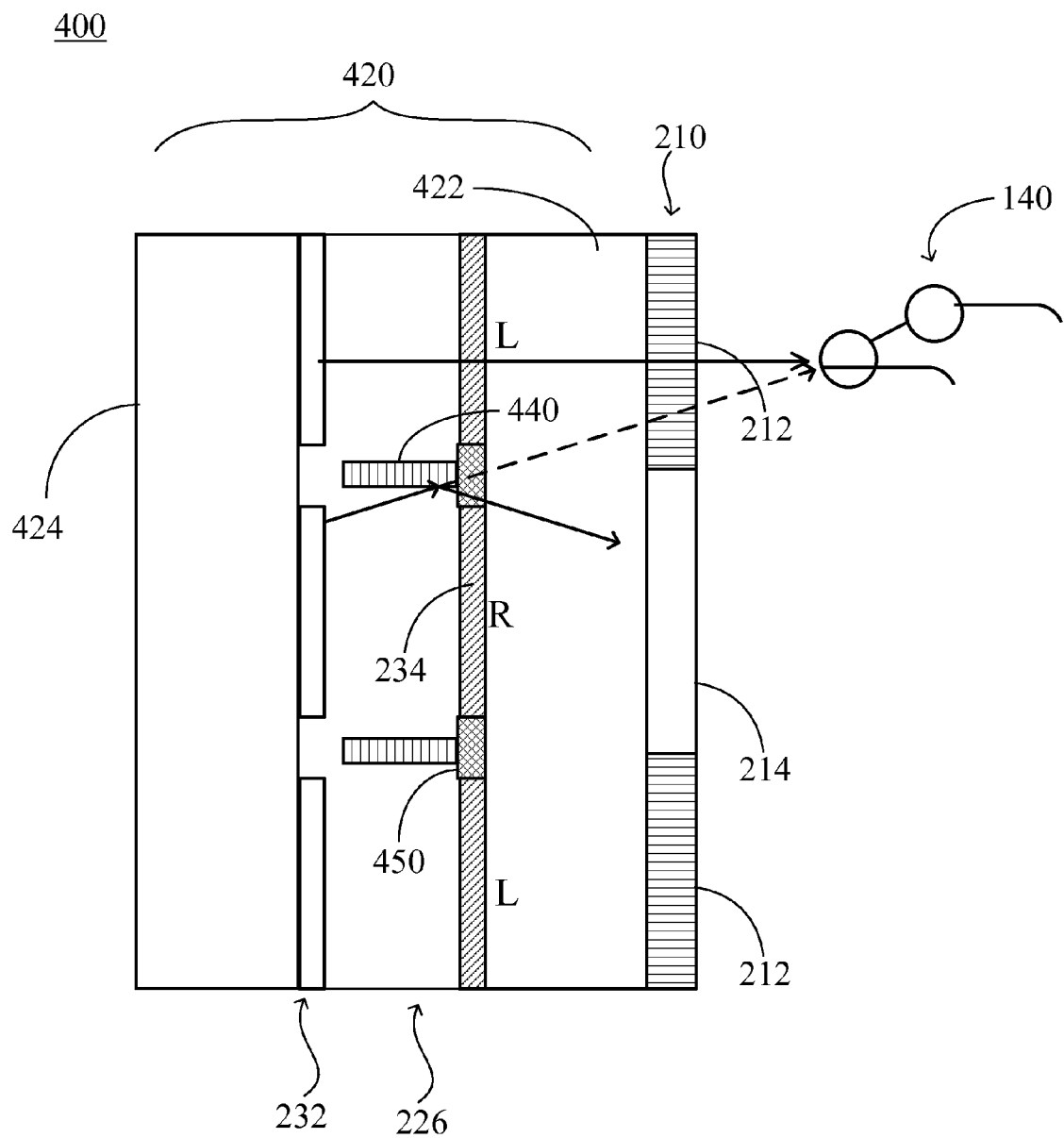
FIG. 4 is a partial sectional view illustrating a stereoscopic panel according to a second preferred embodiment of the present invention.

The following will explain a second preferred embodiment of the present invention in detail with FIG. 4. Referring to FIG. 4, FIG. 4 is a partial sectional view illustrating a stereoscopic panel according to a second preferred embodiment of the present invention. The stereoscopic display 400 of the second preferred embodiment of the present invention includes a phase retarder 210, a display panel 420, and the board-like structures 440. The display panel 420 has a first substrate 422, a second substrate 424, and a liquid-crystal layer 226 disposed between the first substrate 422 and the second substrate 424. The board-like structures 440 is disposed in the liquid-crystal layer 226 of the display panel 420. The pixel rows are respectively separated from each other by the board-like structures 440. In the embodiment, a length of the board-like structures 440 is equal to a length of the pixel rows (i.e. the length of one side of the display panel 420), and the height of the board-like structures 440 is less than the thickness of the liquid-crystal layer 226.

The difference between the second embodiment and the first embodiment is that the first substrate 422 is a color filter substrate, and the second substrate is a thin-film transistor (TFT) array substrate. In the embodiment, the board-like structures 440 are disposed on the first substrate 422. In order to increase the an aperture rate, the board-like structures 440 can be disposed on black matrices (BM) 450 of the color filter substrate, in which the BM 450 are disposed beside the color resists 234.

Likewise, one of the board-like structures 440 is disposed between the two adjacent pixel rows for obstructing therebetween. Thus, the right eye image R of the pixel rows corresponding to the second strip shapes 214 is reflected by the board-like structure 440, so it is not easy to be transmitted to the first strip shapes 212 of the phase retarder 210 for entering the left lens of the glasses 140. Similarly, the left eye image L of the pixel rows corresponding to the first strip shapes 212 is reflected by the board-like structure 440, so it is not easy to be transmitted to the second strip shapes 214 of the phase retarder 210 for entering the right lens of the glasses 140. Therefore, the crosstalk phenomenon is decreased, and the 3D viewing effect of the stereoscopic display is raised.

In other embodiments, the first substrate of the display panel can be a TFT array substrate, and the second substrate can be a color filter substrate. The board-like structures are disposed on the array substrate. The implementation of the embodiments is similar to the aforementioned, so no further detail will be provided herein.

In summary, because there is one of the board-like structures disposed between two adjacent pixel rows for obstructing therebetween, the crosstalk phenomenon is decreased, and then the 3D viewing effect of the stereoscopic display is raised. In addition, as to the display panel fabricated by the COA processes, because a color filter structure is positioned on the array substrate, the color filter is located far from the phase retarder. Thus, the crosstalk phenomenon is more serious. However, the left and right images of the pixel rows can be controlled to propagate toward the corresponding first and second strip shapes, so that the crosstalk phenomenon is decreased.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A stereoscopic display, comprising:
    a phase retarder having a plurality of first strip shapes and a plurality of second strip shapes, the first strip shapes and the second strip shapes alternately arranged, wherein the first strip shapes and the second strip shapes are parallel to a horizontal direction;
    a display panel having a first substrate, a second substrate, and a liquid-crystal layer disposed between the first substrate and the second substrate, wherein the first substrate is a color filter on array substrate, the display panel further having a plurality of pixels, the pixels arranged into a plurality of pixel rows corresponding to the first strip shapes and the second strip shapes; and
    a plurality of board-like structures disposed in the liquid-crystal layer of the display panel, wherein the pixel rows are respectively separated from each other by the board-like structures.

2. The stereoscopic display of claim 1, wherein a length of the board-like structures is equal to a length of the pixel rows, and a height of the board-like structures is less than or equal to a thickness of the liquid-crystal layer.

3. The stereoscopic display of claim 1, wherein the board-like structures are disposed on the color filter on array substrate.

4. The stereoscopic display of claim 1, wherein the board-like structures are disposed on the second substrate.

5. The stereoscopic display of claim 1, wherein the board-like structures are made of high molecular polymers.

6. A stereoscopic display, comprising:
    a phase retarder having a plurality of first strip shapes and a plurality of second strip shapes, the first strip shapes and the second strip shapes alternately arranged;
    a display panel having a first substrate, a second substrate, and a liquid-crystal layer disposed between the first substrate and the second substrate, the display panel further having a plurality of pixels, the pixels arranged into a plurality of pixel rows corresponding to the first strip shapes and the second strip shapes; and
    a plurality of board-like structures disposed in the liquid-crystal layer of the display panel, wherein the pixel rows are respectively separated from each other by the board-like structures.

7. The stereoscopic display of claim 6, wherein a length of the board-like structures is equal to a length of the pixel rows, and a height of the board-like structures is less than or equal to a thickness of the liquid-crystal layer.

8. The stereoscopic display of claim 6, wherein the board-like structures are disposed on the first substrate.

9. The stereoscopic display of claim 8, wherein the first substrate is a color filter on array substrate.

10. The stereoscopic display of claim 8, wherein the first substrate is a TFT array substrate, and the second substrate is a color filter substrate.

11. The stereoscopic display of claim 8, wherein the first substrate is a color filter substrate, and the second substrate is a TFT array substrate.

12. The stereoscopic display of claim 11, wherein the board-like structures are disposed on black matrices of the color filter substrate.

13. The stereoscopic display of claim 6, wherein the board-like structures are made of high molecular polymers.

14. The stereoscopic display of claim 6, wherein the first strip shapes and the second strip shapes are parallel to a horizontal direction.

15. The stereoscopic display of claim 6, wherein the first strip shapes and the second strip shapes are parallel to a vertical direction.

* * * * *